United States Patent [19]

Terrevazzi

[11] 4,252,829

[45] Feb. 24, 1981

[54] CHEWING GUM WITH FLAVOURED LIQUID FILLING

[75] Inventor: Francesco Terrevazzi, Lainate, Italy

[73] Assignee: Perfetti S.p.A., Milan, Italy

[21] Appl. No.: 18,182

[22] Filed: Mar. 7, 1979

[30] Foreign Application Priority Data

Mar. 13, 1978 [IT]  Italy ................................ 21167 A/78

[51] Int. Cl.³ ............................................. A23G 3/30
[52] U.S. Cl. ......................................... 426/5; 426/3; 426/103
[58] Field of Search ........................ 426/5, 6, 3, 4, 103

[56] References Cited

U.S. PATENT DOCUMENTS

| | | | |
|---|---|---|---|
| 810,210 | 1/1906 | Laws | 426/5 |
| 3,071,476 | 1/1963 | Werft et al. | 426/3 |
| 3,857,963 | 12/1974 | Graff et al. | 426/5 |
| 3,894,154 | 7/1975 | Graff et al. | 426/5 |
| 4,156,740 | 5/1979 | Glass et al. | 426/3 |

*Primary Examiner*—Jeanette M. Hunter
*Attorney, Agent, or Firm*—Brich, Stewart, Kolasch & Birch

[57] ABSTRACT

A flavored liquid filling composition for chewing gum comprising an aqueous solution of preselected sugars and containing 75% solids, liquid sorbitol in the proportion of 8 to 13% by weight of the liquid filling, and a solution of selected flavoring in propylene glycol in the proportion of 2 to 5% by weight of the liquid filling.

8 Claims, No Drawings

CHEWING GUM WITH FLAVOURED LIQUID FILLING

BACKGROUND OF THE INVENTION

The present invention relates to chewing gum of the kind comprising a flavoured liquid filling encapsulated in a chewing gum body.

More specifically, the invention relates to a flavoured liquid filling composition for chewing gum of the aforementioned kind and a method of manufacturing the aforementioned liquid filling.

The main purpose of manufacturing and selling chewing gum containing flavoured liquid filling is to provide the consumer with a product which, when the covering is broken, discharges a flavoured spray in the consumer's mouth and can then be eaten like conventional gum.

To this end, it is particularly necessary for the liquid filling to maintain its fluidity and flavour practically unchanged from the moment when it is encapsulated in the piece of chewing gum.

The various commercially-obtainable liquid filling compositions for chewing gum are such that the filling slowly crystallizes after they are encapsulated in the gum covering, resulting in a relatively rapid loss of water and consequently in a relatively rapid decrease in the desired fluidity of the filling. As a result, depending on the time between the manufacture of chewing gum encapsulating an aforementioned liquid filling and the consumption thereof, the "spray" effect when the gum covering is broken will be non-existent or less perceptible by the consumer.

To obviate this technical disadvantage, i.e. in order to eliminate or considerably slow down the crystallization, it has been suggested that the formulation of the flavoured liquid fillings should contain an additive such that the composition retains a constant water content not less than a predetermined critical value, e.g. not below 17% by weight. To this end, U.S. Pat. No. 3,894,154 teaches the use of an additive comprising glycerin in the proportion of 3 to 20% by weight of the flavoured liquid filling.

In accordance with the last-mentioned teaching, chewing gum has been manufactured such that the flavoured liquid filling has retained the desired fluidity for a satisfactory, acceptable time. However, this recognized improvement is counter-balanced by the fact that, even in a relatively short time, liquid filling compositions containing the aforementioned additive, e.g. glycerin, have a flavour and taste which is greatly reduced to a point where it becomes imperceptible.

One possible interpretation of this disadvantage is that, in the aforementioned liquid filling compositions for chewing gum, the favouring component (which is mainly oily and therefore water-repellent) tends to migrate from the liquid filling to the gum covering, where it becomes soluble and combines with one or more components of the basic formulation of the covering. The migration is considerably assisted by the relatively high, practically constant water content, which is present in the liquid filling composition due to the additive used therein to maintain its fluidity.

The object of the present invention is to provide a liquid filling composition for chewing gum which obviates the aforementioned disadvantages of the prior art, i.e. retains the desired, required fluidity and intensity of taste.

SUMMARY OF THE INVENTION

To this end, according to the present invention, the liquid filling comprises an aqueous solution containing dissolved solid portions, liquid sorbitol in the proportion of 8 to 13% by weight of the liquid filling, and a solution of selected flavouring in propylene glycol in the proportion of 2 to 5% by weight of the liquid filling.

Other features and advantages of the present invention will be clear from the following description of a method of preparing a liquid filling composition for chewing gum according to the invention, and comparative tests between chewing gum containing a liquid filling according to the invention and a prior-art liquid filling.

DESCRIPTION OF A PREFERRED EMBODIMENT

An aqueous syrup containing 75% solids was prepared by conventional means when hot, by mixing 50 kg glucose, 30 kg invert sugar, 10 kg saccharose and 10 kg water.

86 parts by weight of the aforementioned aqueous syrup were cooled to ambient temperature and left undisturbed in a suitable vessel, after which 10 parts by weight of liquid sorbitol were added together with 4 parts by weight of a solution prepared from propylene glycol flavouring in the ratio 1:4.

After the substances had been added, the entire contents of the vessel was mechanically agitated until a stable homogeneous solution was obtained.

A first batch of chewing gum having conventional basic formulations was prepared by conventional means, and a flavoured liquid filling comprising the solution according to the present invention was encapsulated in each piece of chewing gum, likewise by conventional means.

More particularly, the total weight of each piece of chewing gum was 5 g whereas the filling weighed 1.1 g.

A second batch of chewing gum was prepared, using the same basic formulation as for the first batch. A liquid filling was encapsulated in each piece of gum. The filling contained the same amount of the same flavouring as the solution according to the invention, but was not dissolved in propylene glycol but contained a predetermined amount of glycerin wetting agent. The pieces of chewing gum in the second batch and the liquid filling for each piece had the same weights as given for the chewing gum in the first batch.

The first and second batch of chewing gum were placed in an oven maintained at 43° C. and 80% relative humidity. At predetermined intervals, chewing gum from the first and second batch was taken from the oven and analyzed to find out the fluidity and the intensity of taste of the respective liquid filling. The tests results are given in the following table, in which the fluidity and intensity of taste of the liquid fillings, measured just after preparation, is denoted by 100.

TABLE

| Samples taken after | Liquid filling according to the invention | | Prior-art liquid filling containing glycerin | |
|---|---|---|---|---|
| | Fluidity | Flavouring | Fluidity | Flavouring |
| 8 days | 100 | 80 | 100 | 80 |
| 15 days | 100 | 80 | 100 | 50 |

TABLE-continued

| Samples taken after | Liquid filling according to the invention | | Prior-art liquid filling containing glycerin | |
|---|---|---|---|---|
| | Fluidity | Flavouring | Fluidity | Flavouring |
| 28 days | 100 | 80 | 100 | 10 |

These results show that, after 28 days in an oven under the specified conditions, chewing gum containing a prior-art liquid filling containing a glycerin additive had practically unchanged fluidity (i.e. the initial water content) but its intensity of taste or flavour was greatly reduced and was practically imperceptible by the consumer.

Chewing gum containing the liquid filling according to the present invention, after 28 days in the oven under the aforementioned conditions, retained a surprisingly intense taste or flavour even though the initial fluid was retained, i.e. the initial water content.

This excellent result is mainly due to the fact that sorbitol, when added to the aqueous syrup, becomes bonded to most of the free water molecules in the syrup and prevents them making contact with the propylene glycol flavouring solution, thus substantially preventing the free water molecules from hydrolysing the propylene glycol molecules which, if hydrolysed, will release the flavouring which in turn will migrate towards the chewing-gum covering.

In the liquid filling according to the invention, most of the propylene glycol molecules are not hydrolysed but remain bonded to the flavouring and also to the sorbitol molecules, towards which they have a known affinity. Consequently, the selected flavouring is efficiently retained in the liquid filling composition according to the invention, and the composition is also efficiently maintained fluid.

The excellent result obtained by means of the composition according to the present invention is due both to the combined (synergistic) action of the sorbitol and propylene glycol and to the aforementioned method of preparing the composition. Numerous carefully-controlled tests have shown that optimum results were obtained only if the sorbitol and propylene glycol flavouring solution were completely added to the aqueous syrup before the syrup was disturbed. In alternative tests, the sorbitol was added to the syrup with agitation, after which the propylene glycol flavouring solution was added without stopping the agitation. In these tests, the flavouring invariably separated from the final composition.

In the aforementioned composition, the amount of sorbitol and propylene glycol flavouring solution was varied between 8 and 13 parts by weight and 2 and 5 parts by weight respectively, and the resulting fluidity and intensity of taste quite comparable with the aforementioned results.

What is claimed is:

1. A flavored liquid fill for center-filled chewing gum consisting essentially of an aqueous solution containing dissolved solid portions, from 8 to 13% by weight of liquid sorbitol and from 2 to 5% by weight of a solution of propylene glycol containing a selected flavoring agent.

2. The flavored liquid fill according to claim 1, wherein the aqueous solution contains 10% by weight of liquid sorbitol and 4% by weight of a solution of propylene glycol containing the selected flavoring agent.

3. The flavored liquid fill according to claim 1, wherein the selected flavoring agent and the propylene glycol are present in a ratio of 1 to 4 in said solution.

4. The flavored liquid fill of claim 1, wherein the dissolved solid portions comprises an aqueous solution of pre-selected sugars.

5. The flavored liquid fill of claim 4, wherein the aqueous solution is a sugar and water syrup containing about 75% solids.

6. A method of preparing a flavored liquid fill for center filled chewing gum comprising the steps of
preparing an aqueous sugar solution by mixing selected sugars with water with the application of heat,
preparing a solution of a selected flavor-producing material in propylene glycol in a ratio of 1 to 4,
adding to said aqueous sugar solution which is maintained undisturbed at room temperature, liquid sorbitol in an amount of 8 to 13% by weight, based on the weight of the liquid fill and said flavored propylene glycol solution in an amount of 2 to 5% by weight based on the weight of the liquid fill, and continuing the agitation until a stable homogeneous solution is obtained.

7. The method of claim 6, wherein the liquid sorbitol is present in an amount of 10% by weight and the solution of flavored propylene glycol is present in an amount of 4% by weight, based on the weight of the liquid fill.

8. The method of claim 6, wherein the aqueous solution is a sugar and water syrup containing about 75% solids.

* * * * *